(12) United States Patent
Yeh

(10) Patent No.: US 8,857,846 B1
(45) Date of Patent: Oct. 14, 2014

(54) FRAME STRUCTURE OF A BABY CARRIAGE

(71) Applicant: Kingstar Business Group Corporation, Tortola (VG)

(72) Inventor: Chun-Tun Yeh, Tortola (VG)

(73) Assignee: Kingstar Business Group Corporation, Tortola (VG)

( * ) Notice: Subject to any disclaimer, the term of this patent is extended or adjusted under 35 U.S.C. 154(b) by 0 days.

(21) Appl. No.: 14/093,550

(22) Filed: Dec. 2, 2013

(30) Foreign Application Priority Data

Apr. 8, 2013 (CN) ...................... 2013 2 0170512 U

(51) Int. Cl.
*B62B 7/06* (2006.01)

(52) U.S. Cl.
CPC ....................................... *B62B 7/06* (2013.01)
USPC .......................................... 280/650; 280/642

(58) Field of Classification Search
CPC .......... B62B 7/08; B62B 7/064; B62B 7/066; B62B 7/062; B62B 2205/06; B62B 7/06; A61G 2005/0833; A61G 2005/0891; A61G 5/08
USPC .......................... 280/42, 642, 647, 650, 47.38
See application file for complete search history.

(56) References Cited

U.S. PATENT DOCUMENTS

| | | | | | |
|---|---|---|---|---|---|
| 2,410,797 | A | * | 11/1946 | Allenbaugh | 280/642 |
| 2,615,725 | A | * | 10/1952 | Person | 280/644 |
| 2,685,325 | A | * | 8/1954 | Webster | 297/30 |
| 2,803,470 | A | * | 8/1957 | Welsh | 280/642 |
| 3,421,774 | A | * | 1/1969 | Patterson | 280/642 |
| 6,375,213 | B1 | * | 4/2002 | Suzuki | 280/649 |
| 6,464,244 | B1 | * | 10/2002 | Cheng | 280/650 |
| 6,692,015 | B2 | * | 2/2004 | Perego | 280/647 |
| 7,404,569 | B2 | * | 7/2008 | Hartenstine et al. | 280/642 |
| 7,845,671 | B2 | * | 12/2010 | Cone, II | 280/650 |

* cited by examiner

*Primary Examiner* — J. Allen Shriver, II
*Assistant Examiner* — Bridget Avery
(74) *Attorney, Agent, or Firm* — Prakash Nama; Global IP Services, PLLC

(57) ABSTRACT

An improved frame structure of a baby carriage is provided, including a handle, a connecting rod, a folding assembly, a support rod and a linkage rod assembly. The connecting rod has one end connected to the handle and the other one connected to the folding assembly. The folding assembly includes a first transmission rod and a second transmission rod. The first transmission rod has one end connected to the connecting rod and the other end connected to the support rod. The second transmission rod has one end connected to the first transmission rod and the other end connected to the linkage rod assembly. The improved frame structure is easy to use and portable.

2 Claims, 3 Drawing Sheets

FRAME STRUCTURE OF A BABY CARRIAGE

BACKGROUND OF THE INVENTION

The present invention relates to the technical field of baby carriage in particular to an improved frame structure of foldable baby carriages.

A baby carriage is a vehicle designed for babies, bringing convenience to people when going out. The frame of the baby carriage generally is conveniently foldable, capable of minimizing space of the baby carriage with a folding mechanism. However, traditional baby carriages are usually large in size. Besides, the folding mechanism has a complicated structure, is not easy to fold and carry, and causes inconvenience to users.

BRIEF SUMMARY OF THE INVENTION

For reasons mentioned above, to solve technical problems in prior art, it is necessary to provide an improved frame structure of a baby carriage, which is simple, rational in design, easy to fold and operate, small in size after being folded, and portable.

An improved frame structure of a baby carriage is provided, comprising a handle, a connecting rod, a folding assembly, a support rod and a linkage rod assembly. The connecting rod has one end connected to the handle and the other end connected to the folding assembly. The folding assembly comprises a first transmission rod and a second transmission rod. The first transmission rod has one end connected to the connecting rod and the other end connected to the support rod. The second transmission rod has one end connected to the first transmission rod and the other end connected to the linkage rod assembly.

In one embodiment, the handle is fixedly connected to one end of the connecting rod through a fixing member, while the other end of the connecting rod is connected to the first transmission rod through a first connecting shaft; the connecting rod is provided with a connecting lug; and the connecting lug is connected to the linkage rod assembly through a second connecting shaft.

In one embodiment, the support rod is T-shaped, provided with a first connecting portion, a second connecting portion and a third connecting portion; the first connecting portion and the second connecting portion are connected to the linkage rod assembly; and the third connecting portion is fixedly connected to a rear wheel set.

In one embodiment, the linkage rod assembly comprises a first linkage rod and a second linkage rod; the first linkage rod has one end connected to the connecting rod and the other connected to the first connecting portion through a third connecting shaft; the second linkage rod has one end connected to the second connecting portion through a fourth connecting shaft and the other end fixedly connected to a front wheel set.

In one embodiment, the first linkage rod is connected to the middle position of the support rod through a first pivoting shaft; the second transmission rod is U-shaped; and the second transmission rod has one end connected to the first transmission rod through a second pivoting shaft and the other connected to the second connecting rod through a third pivoting shaft.

The mentioned improved frame structure of the baby carriage is simple and rationally designed, realizes three-segment folding from the front and the back through the connecting rod, folding assembly and linkage rod assembly, is smaller after being folded, easy to operate and fold, and very useful.

Figure 1:
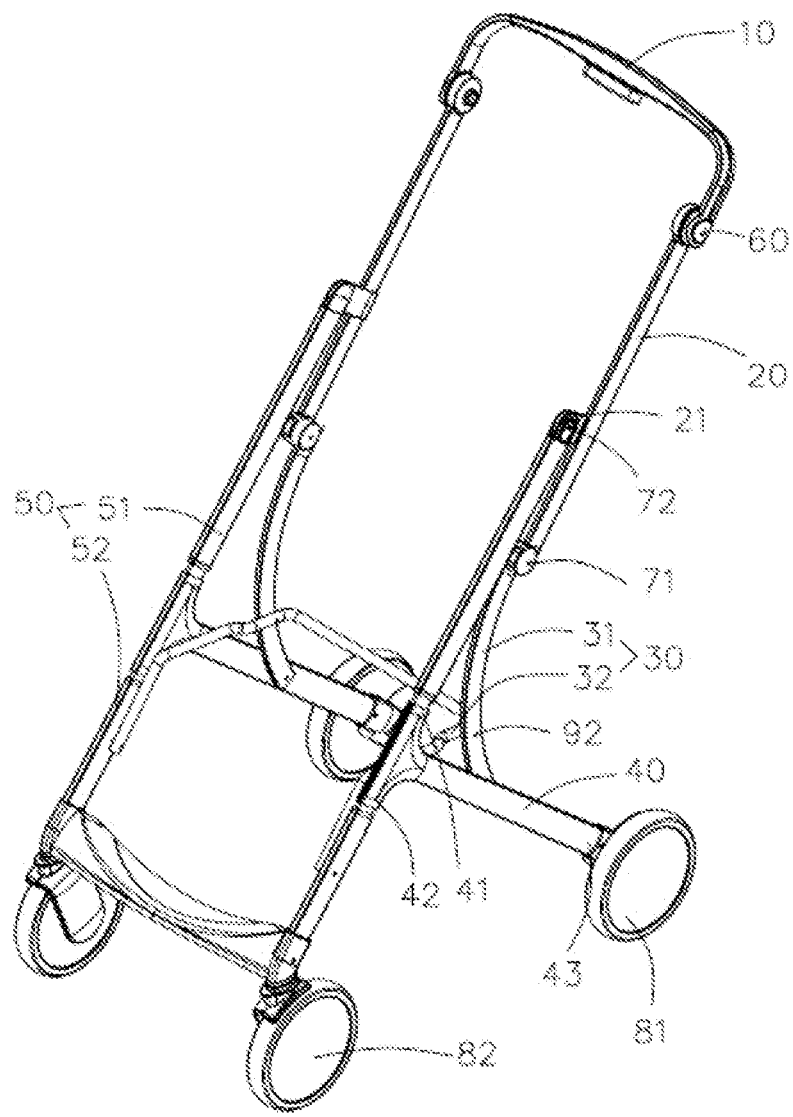
FIG. 1 is a three-dimensional structural view of the present invention after expansion.
Figure 2:
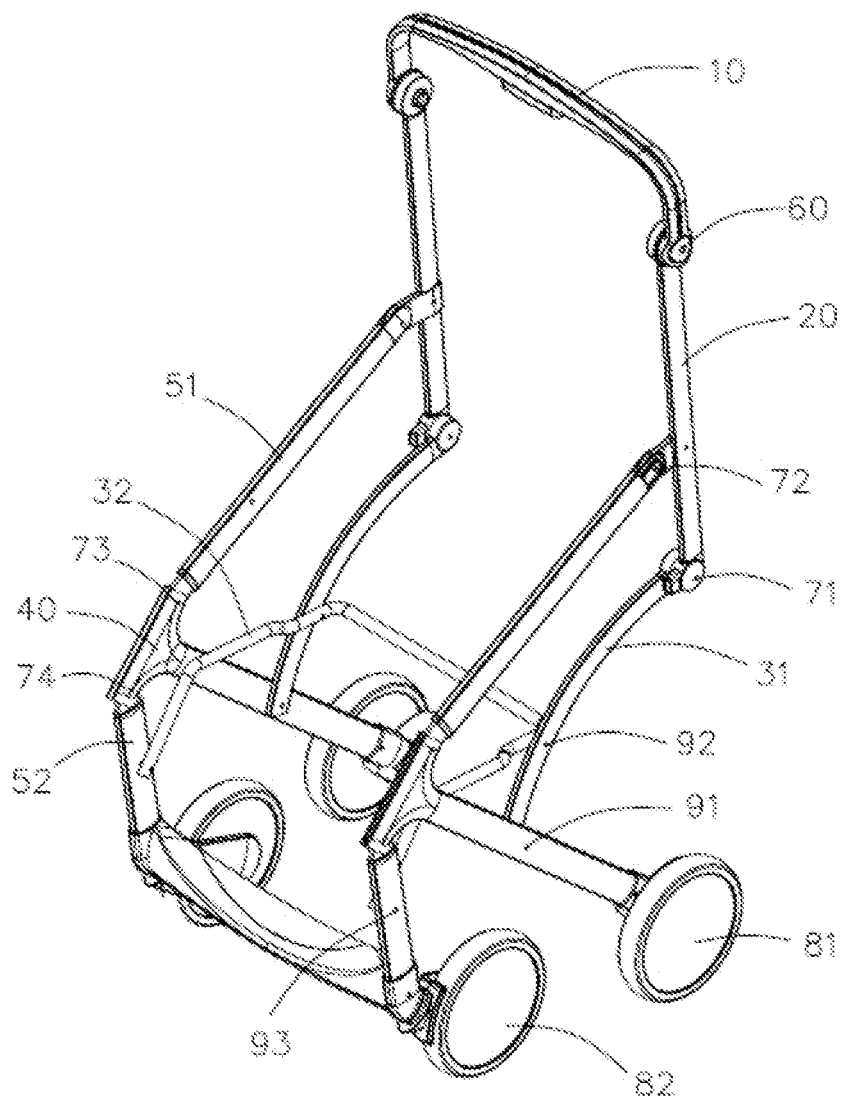
FIG. 2 is a state schematic view of the present invention in the folding process.
Figure 3:
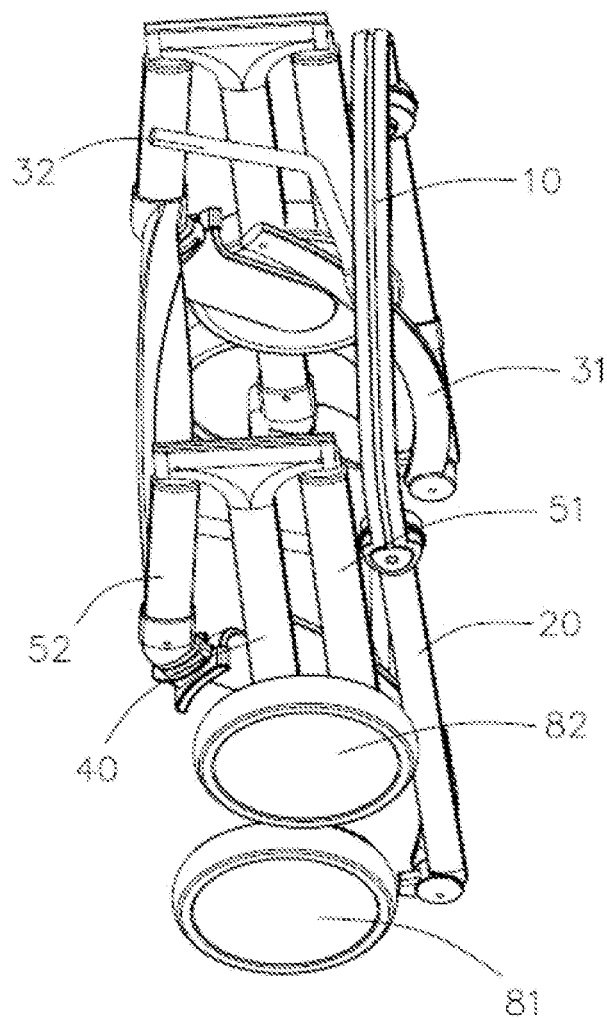
FIG. 3 is a structural view of the present invention after being folded.

The following are numbers corresponding to components of the present invention:

Handle 10, connecting rod 20, connecting lug 21, folding assembly 30, first transmission rod 31, second transmission rod 32, support rod 40, first connecting portion 41, second connecting portion 42, third connecting portion 43, linkage assembly 50, first linkage rod 51, second linkage rod 52, fixing member 60, first connecting shaft 71, second connecting shaft 72, third connecting shaft 73, four connecting shaft 74 rear wheel set 81, front wheel set 82, first pivoting shaft 91, second pivoting shaft 92, third pivoting shaft 93.

DETAILED DESCRIPTION OF THE INVENTION

To further understand the features, technical means, objectives, functions, advantages and spirit of the present invention, the following are detailed description of the present invention with reference to attached drawings and specific embodiments.

An improved frame structure of a baby carriage comprises a handle 10, a connecting rod 20, a folding assembly 30, a support rod 40 and a linkage rod assembly 50. One end of the connecting rod 20 is connected to the handle 10, while the other end of the connecting rod 20 is connected to the folding assembly 30. The support rod 40 is connected to the folding assembly 30. The connecting rod 20 is connected to the support rod 40.

The folding assembly 30 comprises a first transmission rod 31 and a second transmission rod 32. One end of the first transmission rod 31 is movably connected to the connecting rod 20, while the other end of the first transmission rod 31 is movably connected to the support rod 40. One end of the second transmission rod 32 is connected to the first transmission rod 31, and the other end of the second transmission rod 32 is connected to the linkage rod assembly 50.

The handle 10 is fixedly connected to one end of the connecting rod 20 through a fixing member 60, and the other end of the connecting rod 20 is connected to the first transmission rod 31 through a first connecting shaft 71. The connecting rod 20 is provided with a collecting lug 21. The collecting lug 21 is connected to the linkage rod assembly 50 through a second connecting shaft 72. The connecting rod 20 is able to rotate relative to the first transmission rod 31 and the linkage rod assembly 50 such that the baby carriage is folded conveniently.

The support rod 40 is T-shaped. The support rod 40 is provided with a first connecting portion 41, a second connecting portion 42 and a third connecting portion 43. The first connecting portion 41 and the second connecting portion 42 both are connected to the linkage rod assembly 50. The third connecting portion 43 is fixedly connected to a rear wheel set 81.

The linkage rod assembly 50 comprises a first linkage rod 51 and a second linkage rod 52. One end of the first linkage rod 51 is connected to the connecting rod 20, and the other end of the first linkage rod 51 is connected to the first connecting portion 41 through a third connecting shaft 73. The first linkage rod 51 can rotate around the first connecting portion 41. One end of the second linkage rod 52 is connected to the second connecting portion 42 through a fourth connecting shaft 74. The second linkage rod 52 can rotate around the second connecting portion 42. The other end of the second linkage rod 52 is fixedly connected to a front wheel set 82.

The first transmission rod 31 is connected to the middle position of the support rod 40 through a first pivoting shaft 91 and rotates along the first pivoting shaft 91. The second transmission rod 32 is U-shaped. One end of the second transmission rod 32 is connected to the transmission rod 31 through a second pivoting shaft 92, and the other end of the second transmission rod 32 is connected to the second linkage rod 52 through a third pivoting shaft 93. When the baby carriage is folded, the second transmission rod 32 drive the second linkage rod 52 to be folded towards the support rod 40.

In use, when the baby carriage is required to be folded, push the handle 10 towards the linkage rod assembly 50, and then the handle 10 drives the connecting rod 20 to move. The connecting rod 20 drives the first transmission rod 31 to rotate downward through the first connecting shaft 71, and the first linkage rod 51 to rotate downward through the second connecting shaft 72. The first transmission rod 31 is folded downward, and the rotation of the second pivoting shaft 92 drives the end of the second transmission rod 32 in connection to move downward such that the second transmission rod 32 moves towards the handle 10. The second transmission rod 32 drives the second linkage rod 52 to rotate towards the support rod 40 through rotation of the third pivoting shaft 93. Finally, the folding assembly 30 activate the connecting rod 20, the first linkage rod 51, the second linkage rod 52 and the support rod 40 to generate three-segment folding. After folding, the front wheel set 82 is located above the rear wheel set 81. During folding, the support rod 40 conducts supporting function.

To expand the baby carriage, it is only needed to lift the handle 10 upward, and then the baby carriage can be completely expanded through rotation of the linkage rod assembly 50 and the folding assembly 30.

In conclusion, the improved frame structure of the baby carriage is simple and rationally designed, realizes three-segment folding from the front and the back through the connecting rod 20, the folding assembly 30, the linkage rod assembly 50 and the support rod 40, is smaller after being folded, easy to operate and fold, and convenient.

The above embodiments are just some of the present invention, described in detail, but they cannot be accordingly used as the limit of the scope of the present invention. It should be noted that, for those ordinary skilled in this art, modifications and improvements an be made without departing from the inventive concept of the present invention, all of which shall fall within the protection scope of the present invention. Therefore, the protection scope of the present invention shall be subject to the claims attached.

What is claimed is:

1. An improved frame structure of a baby carriage, comprising a handle, a connecting rod, a folding assembly, a support rod and a linkage rod assembly; said connecting rod haying one end connected to said handle and the other end connected to said folding assembly; said folding assembly comprising a first transmission rod and a second transmission rod; said first transmission rod having one end connected to said connecting rod and the other end connected to said support rod; and said second transmission rod having one end connected to said first transmission rod and the other end connected to said linkage rod assembly; said handle is fixedly connected to one end of said connecting rod through a fixing member, while the other end of said connecting rod is connected to said first transmission rod through a first connecting shaft; said connecting rod is provided with a connecting lug; and said connecting lug is connected to said linkage rod assembly through a second connecting shaft; said support rod is T-shaped; said support rod is provided with a first connecting portion, a second connecting portion and a third connecting portion; said first connecting portion and said second connecting portion are connected to said linkage rod assembly; and said third connecting portion is fixedly connected to a rear wheel set; said linkage rod assembly comprises a first linkage rod and a second linkage rod; said first linkage rod has one end connected to said connecting rod and the other end connected to said first connecting portion through a third connecting shaft; said second linkage rod has one end connected to said second connecting portion through a fourth connecting shaft and the other end fixedly connected to a front wheel set.

2. The improved frame structure of a baby carriage according to claim 1, wherein said first linkage rod is connected to the middle position of said support rod through a first pivoting shaft; said second transmission rod is U-shaped; and said second transmission rod has one end connected to said first transmission rod through a second pivoting shaft and the other connected to said second connecting rod through a third pivoting shaft.

* * * * *